(12) United States Patent
Kumagae et al.

(10) Patent No.: US 12,107,215 B2
(45) Date of Patent: Oct. 1, 2024

(54) SOLID-STATE BATTERY

(71) Applicant: Murata Manufacturing Co., Ltd., Nagaokakyo (JP)

(72) Inventors: Kiyoshi Kumagae, Nagaokakyo (JP); Sumito Shiina, Nagaokakyo (JP); Koichi Nakano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 561 days.

(21) Appl. No.: 17/405,410

(22) Filed: Aug. 18, 2021

(65) Prior Publication Data

US 2021/0384550 A1 Dec. 9, 2021

Related U.S. Application Data

(63) Continuation of application No. PCT/JP2020/006614, filed on Feb. 19, 2020.

(30) Foreign Application Priority Data

Mar. 27, 2019 (JP) .................................. 2019-061579

(51) Int. Cl.
 *H01M 10/0562* (2010.01)
 *H01M 4/134* (2010.01)
 (Continued)

(52) U.S. Cl.
 CPC ....... *H01M 10/0562* (2013.01); *H01M 4/134* (2013.01); *H01M 4/485* (2013.01);
 (Continued)

(58) Field of Classification Search
 None
 See application file for complete search history.

(56) References Cited

U.S. PATENT DOCUMENTS

2004/0185336 A1 9/2004 Ito et al.
2010/0261064 A1 10/2010 Oh et al.
(Continued)

FOREIGN PATENT DOCUMENTS

JP 2004273436 A 9/2004
JP 2011198692 A 10/2011
(Continued)

OTHER PUBLICATIONS

Written Opinion of International Searching Authority issued for PCT/JP2020/006614, date of mailing May 19, 2020.
(Continued)

*Primary Examiner* — Carlos Barcena
(74) *Attorney, Agent, or Firm* — ArentFox Schiff LLP

(57) ABSTRACT

A solid state battery that includes at least one battery constituent unit including a positive electrode layer, a negative electrode layer, and a solid electrolyte layer interposed therebetween; a positive electrode external terminal on a first side surface of the solid state battery laminate; and a negative electrode external terminal on a second side surface of the solid state battery laminate. The positive electrode layer and the negative electrode layer each include a terminal contact portion in direct contact with the positive electrode external terminal and the negative electrode external terminal, respectively, and a non-terminal contact portion that is not in direct contact with the positive electrode external terminal and the negative electrode external terminal, respectively, and in at least one of the positive electrode layer and the negative electrode layer, a sectional area of the terminal contact portion is smaller than a sectional area of the non-terminal contact portion.

20 Claims, 9 Drawing Sheets

(51) Int. Cl.
    *H01M 4/485*     (2010.01)
    *H01M 4/62*     (2006.01)
    *H01M 10/0525*     (2010.01)
    *H01M 10/0585*     (2010.01)
    *H01M 50/531*     (2021.01)
    *H01M 50/586*     (2021.01)
    *H01M 50/59*     (2021.01)
    *H01M 4/02*     (2006.01)

(52) U.S. Cl.
    CPC ....... *H01M 4/621* (2013.01); *H01M 10/0585* (2013.01); *H01M 50/531* (2021.01); *H01M 50/586* (2021.01); *H01M 50/59* (2021.01); *H01M 2004/027* (2013.01); *H01M 2004/028* (2013.01); *H01M 10/0525* (2013.01)

(56) References Cited

U.S. PATENT DOCUMENTS

| | | |
|---|---|---|
| 2015/0255827 A1 | 9/2015 | Matsushita et al. |
| 2019/0288246 A1 | 9/2019 | Kato et al. |
| 2019/0393505 A1 | 12/2019 | Suzuki et al. |
| 2021/0305579 A1 | 9/2021 | Koga |

FOREIGN PATENT DOCUMENTS

| | | |
|---|---|---|
| JP | 2016207540 A | 12/2016 |
| WO | 2018123319 A1 | 7/2018 |
| WO | 2018179580 A1 | 10/2018 |
| WO | 2020137258 A1 | 7/2020 |

OTHER PUBLICATIONS

International Search Report issued for PCT/JP2020/006614, date of mailing May 19, 2020.

FIG. 2A   $a_1-a_1'$
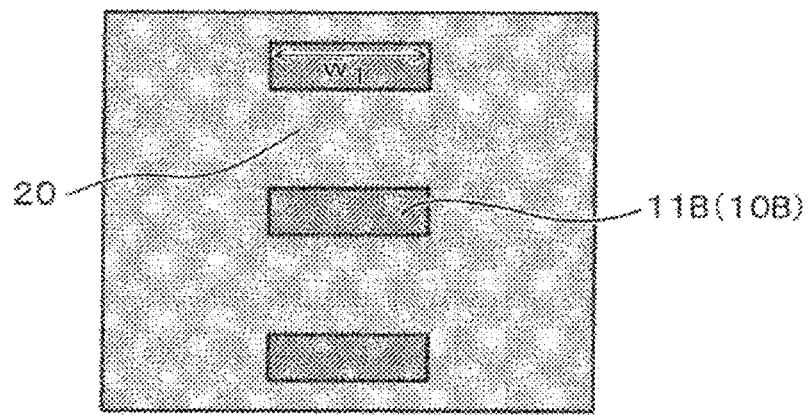
FIG. 2B   $a_2-a_2'$
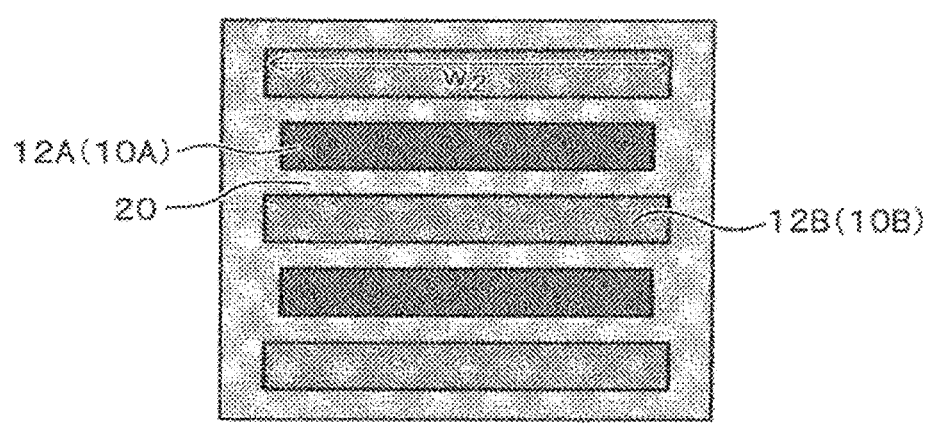

SOLID-STATE BATTERY

CROSS REFERENCE TO RELATED APPLICATIONS

The present application is a continuation of International application No. PCT/JP2020/006614, filed Feb. 19, 2020, which claims priority to Japanese Patent Application No. 2019-061579, filed Mar. 27, 2019, the entire contents of each of which are incorporated herein by reference.

FIELD OF THE INVENTION

The present invention relates to a solid state battery. More specifically, the present invention relates to a stacked solid state battery formed by stacking layers constituting a battery constituent unit.

BACKGROUND OF THE INVENTION

Conventionally, a secondary battery that can be repeatedly charged and discharged has been used for various applications. For example, secondary batteries are used as power sources of electronic devices such as smart phones and notebook computers.

In a secondary battery, a liquid electrolyte is generally used as a medium for ion transfer that contributes to charge and discharge. That is, a so-called electrolytic solution is used for the secondary battery. However, in such a secondary battery, safety is generally required from the viewpoint of preventing leakage of the electrolytic solution. Since an organic solvent or the like used for the electrolytic solution is a flammable substance, safety is required also in that respect.

Thus, a solid state battery using a solid electrolyte instead of an electrolytic solution has been studied.

Patent Document 1: Japanese Patent Application Laid-Open No. 2016-207540

SUMMARY OF THE INVENTION

Generally, a solid state battery includes a solid state battery laminate including a positive electrode layer, a negative electrode layer, and a solid electrolyte layer between the positive electrode layer and the negative electrode layer (see Patent Document 1). For example, as shown in FIGS. 9A and 9B, a positive electrode layer 10A, a solid electrolyte layer 20, and a negative electrode layer 10B are stacked in this order in a stacking direction of a solid state battery laminate 500'. The solid state battery laminate 500' is provided with a positive electrode terminal 30A and a negative electrode terminal 30B which are external terminals in contact with two opposing side surfaces of the solid state battery laminate 500' (that is, a positive electrode side end surface 500'A and a negative electrode side end surface 500'B). Here, the positive electrode layer 10A and the negative electrode layer 10B extend so as to terminate at the positive electrode side end surface 500'A and the negative electrode side end surface 500'B, respectively.

The inventors of the present invention noticed that there were still problems to be overcome in the previously proposed solid state battery as described above, and found need to take measures therefor.

Specifically, the inventors of the present invention found that there were the following problems.

A charge-discharge reaction of the solid state battery can be caused by conduction of ions between a positive electrode and a negative electrode with a solid electrolyte interposed therebetween. In such a solid state battery, due to stress generated between an electrode layer that can change in volume due to expansion/contraction generated during charging and discharging and an external terminal that cannot change in volume or in which a volume change amount can be reduced with respect to the electrode layer, cracking, peeling, and the like of a terminal contact portion that is in direct contact with the electrode layer, particularly the external terminal, may occur.

The present invention has been made in view of the above problems and a main object of the present invention is to provide a solid state battery that more suitably prevents deterioration of battery performance by reducing cracking, peeling, and the like of positive and negative electrode layers during charging and discharging.

Rather than addressing as merely extensions of conventional arts, the inventor of the present invention tried to solve the above problems by addressing from a new point of view. As a result, the invention of a solid state battery which has achieved the above-mentioned main purpose has been reached.

The present invention provides a solid state battery that includes a solid state battery laminate including, along a stacking direction thereof, at least one battery constituent unit having a positive electrode layer, a negative electrode layer, and a solid electrolyte layer interposed between the positive electrode layer and the negative electrode layer; a positive electrode external terminal on a first side surface of the solid state battery laminate; and a negative electrode external terminal on a second side surface of the solid state battery laminate opposite the first side surface. In this solid state battery, the positive electrode layer and the negative electrode layer each include a terminal contact portion in direct contact with the positive electrode external terminal and the negative electrode external terminal, respectively, and a non-terminal contact portion that is not in direct contact with the positive electrode external terminal and the negative electrode external terminal, respectively, and in at least one of the positive electrode layer and the negative electrode layer, a sectional area of the terminal contact portion along the respective first or second side surfaces of the solid state battery laminate is smaller than a sectional area of the non-terminal contact portion along the respective first or second side surfaces.

The solid state battery according to an embodiment of the present invention is a solid state battery that more suitably prevents deterioration of battery performance by reducing cracking, peeling, and the like of the positive and negative electrode layers during charging and discharging.

More specifically, in the solid state battery of the present invention, strength of the solid state battery can be enhanced by reducing the sectional area of the terminal contact portion in at least one electrode layer and increasing a ratio of a battery constituent material having relatively high rigidity with respect to the electrode layer. When such a terminal contact portion contains an electrode active material, it is possible to reduce a volume change of the electrode layer during charging and discharging and to reduce stress generated between the electrode layer and the external terminal. As a result, cracking, peeling, and the like of the electrode layer during charging and discharging can be suppressed. Therefore, deterioration of battery performance of the solid state battery can be more suitably prevented, and long-term reliability of the solid state battery can be improved.

BRIEF EXPLANATION OF THE DRAWINGS

FIGS. 2A and 2B are sectional views schematically showing cross sections of the solid state battery taken along lines $a_1$-$a_1'$ and $a_2$-$a_2'$ in FIG. 1, respectively.

DETAILED DESCRIPTION OF THE INVENTION

Figure 1:
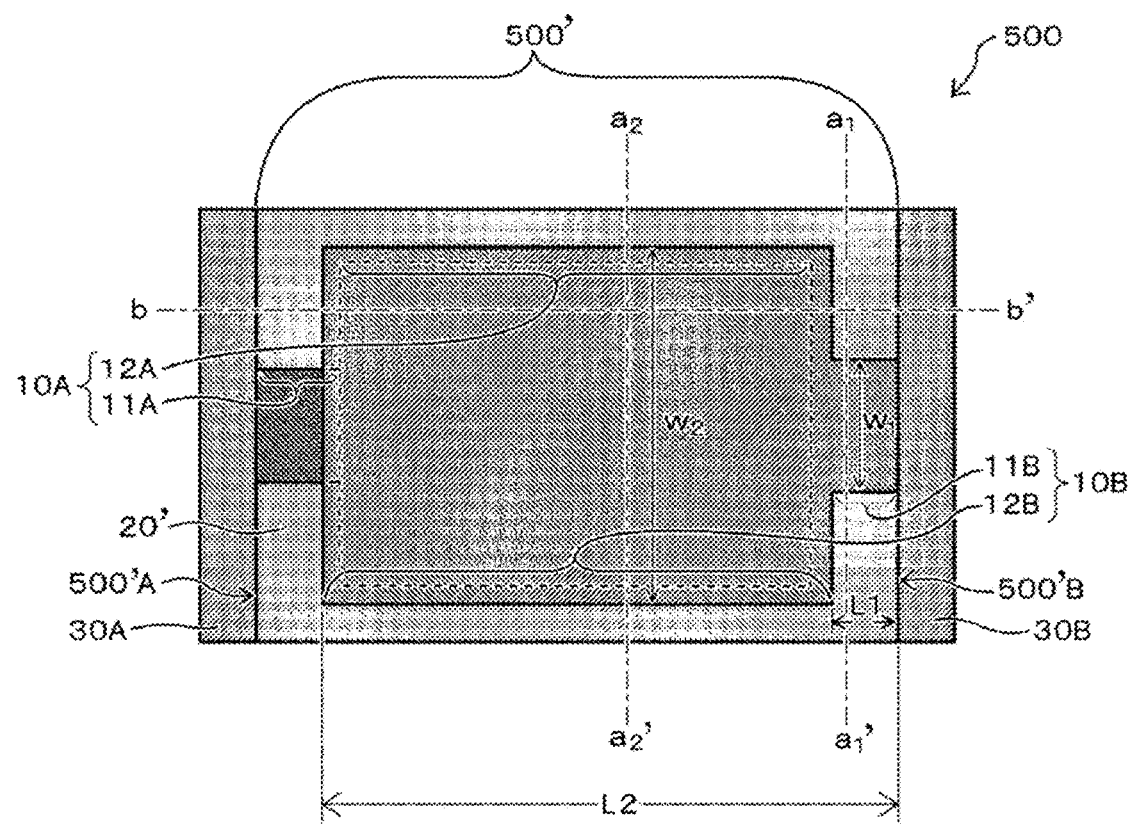
FIG. 1 is a plan view schematically showing an embodiment in which a width dimension of a terminal contact portion in an electrode layer of a solid state battery according to the present invention is smaller than a width dimension of a non-terminal contact portion.

Hereinafter, the "solid state battery" of the present invention will be described in detail. Although description will be made with reference to the drawings as necessary, illustrated contents are schematically and exemplarily shown wherein their appearances, their dimensional proportions and the like are not necessarily real ones, and are merely for the purpose of making it easy to understand the present invention.

The term "solid state battery" used in the present invention refers to, in a broad sense, a battery whose constituent elements are composed of solid and refers to, in a narrow sense, all solid state battery whose constituent elements (particularly preferably all constituent elements) are composed of solid. In a preferred embodiment, the solid state battery in the present invention is a stacked solid state battery configured such that layers constituting a battery constituent unit are stacked with each other, and preferably such layers are composed of a sintered body. The "solid state battery" includes not only a so-called "secondary battery" capable of repeating charging and discharging, but also a "primary battery" capable of only discharging. In a preferred embodiment of the present invention, the "solid battery" is a secondary battery. The "secondary battery" is not excessively limited by its name, and can include, for example, an electric storage device.

The term "planar view" used here is based on a form where an object is viewed from above or below along a thickness direction based on a stacking direction of layers constituting the solid state battery. The term "sectional view" used here is based on a form when viewed from a direction substantially perpendicular to the thickness direction based on the stacking direction of layers constituting the solid state battery (to put it briefly, a form when taken along a plane parallel to the thickness direction).

[Basic Configuration of Solid State Battery]

The solid state battery includes a solid state battery laminate including, along a stacking direction, at least one battery constituent unit including a positive electrode layer, a negative electrode layer, and a solid electrolyte layer interposed between the positive electrode layer and the negative electrode layer.

In the solid state battery, each layer constituting the solid state battery may be formed by firing, and the positive electrode layer, the negative electrode layer, the solid electrolyte layer, and the like may form a sintered layer. Preferably, the positive electrode layer, the negative electrode layer, and the solid electrolyte are fired integrally with each other, and therefore the battery constituent unit forms an integrally sintered body.

The positive electrode layer is an electrode layer containing at least a positive electrode active material. The positive electrode layer may further include a solid electrolyte and/or a positive electrode sub-collector layer. In a preferred embodiment, the positive electrode layer is composed of a sintered body including at least the positive electrode active material, solid electrolyte particles, and the positive electrode sub-collector layer. On the other hand, the negative electrode layer is an electrode layer containing at least a negative electrode active material. The negative electrode layer may further include the solid electrolyte and/or a negative electrode sub-collector layer. In a preferred embodiment, the negative electrode layer is composed of a sintered body including at least the negative electrode active material, solid electrolyte particles, and the negative electrode sub-collector layer.

The positive electrode active material and the negative electrode active material are substances involved in transfer of electrons in the solid state battery. Ion movement (conduction) between the positive electrode layer and the negative electrode layer with the solid electrolyte interposed therebetween and electron transfer between the positive electrode layer and the negative electrode layer with an external circuit interposed therebetween are performed, so that charging and discharging are performed. The positive electrode layer and the negative electrode layer are preferably layers capable of inserting and extracting lithium ions, sodium ions, and the like as ions, particularly lithium ions. That is, preferred is an all-solid-state secondary battery in which lithium ions or sodium ions move between the positive electrode layer and the negative electrode layer with the solid electrolyte interposed therebetween, thereby charging and discharging the battery.

(Positive Electrode Active Material)

The positive electrode active material contained in the positive electrode layer is, for example, a lithium-containing compound. The kind of the lithium-containing compound is not particularly limited, and is, for example, a lithium transition metal composite oxide and a lithium transition metal phosphate compound. The lithium transition metal composite oxide is a generic term for oxides containing lithium and one or two or more kinds of transition metal elements as constituent elements. The lithium transition metal phosphate compound is a generic term for phosphate compounds containing lithium and one or two or more kinds of transition metal elements as constituent elements. The kind of transition metal element is not particularly limited and is, for example, cobalt (Co), nickel (Ni), vanadium (V), chromium (Cr), manganese (Mn), iron (Fe), or the like.

The lithium transition metal composite oxide is, for example, a compound represented by each of $Li_xM1O_2$ and $Li_yM2O_4$. The lithium transition metal phosphate compound is, for example, a compound represented by $Li_zM3PO_4$. However, each of M1, M2, and M3 is one kind or two or more kinds of transition metal elements. The respective values of x, y and z are arbitrary (but not zero (0)).

Specifically, the lithium transition metal composite oxide is, for example, $LiCoO_2$, $LiNiO_2$, $LiVO_2$, $LiCrO_2$, $LiMn_2O_4$ or the like. The lithium transition metal phosphate compound is, for example, $LiFePO_4$, or $LiCoPO_4$.

Examples of the positive electrode active material capable of inserting and extracting sodium ions include at least one selected from the group consisting of a sodium-containing phosphate compound having a nasicon-type structure, a sodium-containing phosphate compound having an olivine-type structure, a sodium-containing layered oxide, a sodium-containing oxide having a spinel-type structure and the like.

(Negative Electrode Active Material)

The negative electrode active material contained in the negative electrode layer is, for example, a carbon material, a metal-based material, a lithium alloy, a lithium-containing compound, or the like.

Specifically, the carbon material is, for example, graphite, easily graphitizable carbon, non-graphitizable carbon, a mesocarbon microbead (MCMB), highly oriented graphite (HOPG), or the like.

The metal-based material is a generic term for a material containing one or two or more metal elements and metalloid elements capable of forming alloy with lithium as constituent elements. The metal-based material may be a simple substance, an alloy (for example, a lithium alloy), or a compound. Since purity of the simple substance described here is not necessarily limited to 100%, the simple substance may contain a trace amount of impurities.

Examples of the metal elements and the metalloid elements include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and platinum (Pt) or the like.

Specifically, the metal-based material is, for example, Si, Sn, $SiB_4$, $TiSi_2$, SiC, $Si_3N_4$, $SiO_v$ ($0<v\leq2$), LiSiO, $SnO_w$ ($0<w\leq2$), $SnSiO_3$, LiSnO, $Mg_2Sn$, or the like.

The lithium-containing compound is, for example, a lithium transition metal composite oxide, a lithium transition metal phosphate compound, or the like. The definition regarding the lithium transition metal composite oxide and the lithium transition metal phosphate compound is as described above or similar to the above definition.

Specifically, examples of the lithium transition metal composite oxide and the lithium transition metal phosphate compound include $Li_3V_2(PO_4)_3$, $Li_3Fe_2(PO_4)_3$, and $Li_4Ti_5O_{12}$.

Examples of the negative electrode active material capable of inserting and extracting sodium ions include at least one selected from the group consisting of a sodium-containing phosphate compound having a nasicon-type structure, a sodium-containing phosphate compound having an olivine-type structure, a sodium-containing oxide having a spinel-type structure and the like.

The positive electrode layer and/or the negative electrode layer may contain an electron conductive material. Examples of the electron conductive material that can be contained in the positive electrode layer and/or the negative electrode layer include a carbon material and a metal material. Specifically, the carbon material is, for example, graphite, carbon nanotube, or the like. The metal material is, for example, copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), palladium (Pd), or the like, and may be an alloy formed of two or more kinds thereof.

The positive electrode layer and/or the negative electrode layer may contain a binder. The binder is, for example, one or two or more of synthetic rubber, polymer materials, and the like. Specifically, the synthetic rubber is, for example, styrene-butadiene-based rubber, fluorine-based rubber, ethylene propylene diene, or the like. Examples of the polymer material include at least one selected from the group consisting of polyvinylidene fluoride, polyimide, and acrylic resin.

In addition, the positive electrode layer and/or the negative electrode layer may contain a sintering aid.

Examples of the sintering aid include at least one selected from the group consisting of lithium oxide, sodium oxide, potassium oxide, boron oxide, silicon oxide, bismuth oxide, and phosphorus oxide.

The thickness of the positive electrode layer and the negative electrode layer is not particularly limited, and may be, for example, 2 μm to 100 μm, particularly 5 μm to 50 μm, independently of each other.

(Solid Electrolyte)

The solid electrolyte is, for example, a material capable of conducting lithium ions, sodium ions, and the like as ions. In particular, the solid electrolyte constituting the battery constituent unit in the solid state battery forms a layer through which, for example, lithium ions can conduct between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. The specific solid electrolyte includes, for example, one or two or more of a crystalline solid electrolyte, a glass-ceramic solid electrolyte, and the like.

The crystalline solid electrolyte is a crystalline electrolyte. Specifically, the crystalline solid electrolyte is, for example, an inorganic material, a polymer material, or the like, and the inorganic material is, for example, a sulfide, an oxide, phosphorus oxide, or the like. The sulfide is, for example, $Li_2S—P_2S_5$, $Li_2S—SiS_2—Li_3PO_4$, $Li_7P_3S_{11}$, $Li_{3.25}Ge_{0.25}P_{0.75}S$, $Li_{10}GeP_2S_{12}$, or the like. Examples of the oxide or phosphorus oxide include $LLi_xM_y(PO_4)_3$ ($1\leq x\leq2$, $1\leq y\leq2$, and M is at least one selected from the group consisting of Ti, Ge, Al, Ga, and Zr) $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, $Li_{1.2}Al_{0.2}Ti_{1.8}(PO_4)_3$, $La_{0.55}Li_{0.35}TiO_3$, and $Li_7La_3Zr_2O_{12}$ and the like. The polymer material is, for example, polyethylene oxide (PEO) or the like.

The glass-ceramic solid electrolyte is an electrolyte in which amorphous and crystal are mixed. The glass-ceramic solid electrolyte is, for example, an oxide containing lithium (Li), silicon (Si), and boron (B) as constituent elements, and more specifically contains lithium oxide ($Li_2O$), silicon oxide ($SiO_2$), boron oxide ($B_2O_3$), and the like. The proportion of the content of lithium oxide to the total content of lithium oxide, silicon oxide, and boron oxide is not particularly limited, and is, for example, 40 mol % to 73 mol %. The proportion of the content of silicon oxide to the total content of lithium oxide, silicon oxide, and boron oxide is not particularly limited, and is, for example, 8 mol % to 40 mol %. The proportion of the content of boron oxide to the total content of lithium oxide, silicon oxide, and boron oxide is not particularly limited, and is, for example, 10 mol % to 50 mol %. In order to measure the respective contents of lithium oxide, silicon oxide and boron oxide, the glass-ceramic solid electrolyte is analyzed by using, for example, inductively coupled plasma emission spectroscopy (ICP-AES).

Examples of the solid electrolyte material capable of conducting sodium ions include a sodium-containing phosphate compound having a nasicon structure, an oxide having a perovskite structure, and an oxide having a garnet-type structure or a structure similar to the garnet-type structure. Examples of the sodium-containing phosphate compound having a nasicon structure include $Na_xM_y(PO_4)_3$ ($1 \leq x \leq 2$, $1 \leq y \leq 2$, M is at least one selected from the group consisting of Ti, Ge, Al, Ga and Zr).

The solid electrolyte layer may contain a binder and/or a sintering aid. The binder and/or the sintering aid that can be contained in the solid electrolyte layer may be selected from, for example, materials similar to the binder and/or the sintering aid that can be contained in the positive electrode layer and/or the negative electrode layer.

The thickness of the solid electrolyte layer is not particularly limited, and may be, for example, 1 μm to 15 μm, particularly 1 μm to 5 μm.

(Positive Electrode Sub-Collector Layer/Negative Electrode Sub-Collector Layer)

As a positive electrode collector material constituting the positive electrode sub-collector layer and a negative electrode collector material constituting the negative electrode sub-collector layer, a material having a high electrical conductivity is preferably used, and for example, at least one selected from the group consisting of a carbon material, silver, palladium, gold, platinum, aluminum, copper, and nickel is preferably used. Each of the positive electrode sub-collector layer and the negative electrode sub-collector layer may have an electrical connection portion for being electrically connected to the outside, and may be configured to be electrically connectable to a terminal. Each of the positive electrode sub-collector layer and the negative electrode sub-collector layer may have a form of a foil, and preferably has a form of integral sintering from the viewpoint of improving electron conductivity by integral sintering and reducing manufacturing cost. When the positive electrode sub-collector layer and the negative electrode sub-collector layer have a form of a sintered body, the positive electrode sub-collector layer and the negative electrode sub-collector layer may be composed of, for example, a sintered body containing an electron conductive material, a binder, and/or a sintering aid. The electron conductive material that can be contained in the positive electrode sub-collector layer and the negative electrode sub-collector layer may be selected from, for example, materials similar to the electron conductive material that can be contained in the positive electrode layer and/or the negative electrode layer. The binder and/or the sintering aid that can be contained in the positive electrode sub-collector layer and the negative electrode sub-collector layer may be selected from, for example, materials similar to the binder and/or the sintering aid that can be contained in the positive electrode layer and/or the negative electrode layer.

The thickness of the positive electrode sub-collector layer and the negative electrode sub-collector layer is not particularly limited, and may be, for example, 1 μm to 10 μm, particularly 1 μm to 5 μm, independently of each other.

(Insulating Layer)

An insulating layer refers to, in a broad sense, a layer that can be formed from a material that does not conduct electricity, that is, a non-conductive material, and refers to, in a narrow sense, a layer that can be formed from an insulating material. Although not particularly limited, the insulating layer may be formed from, for example, a glass material, a ceramic material, or the like. For example, a glass material may be selected as the insulating layer.

Although not particularly limited, examples of the glass material include at least one selected from the group consisting of soda lime glass, potash glass, borate glass, borosilicate glass, barium borosilicate-based glass, zinc borate glass, barium borate glass, borosilicate bismuth salt-based glass, bismuth zinc borate glass, bismuth silicate glass, phosphate glass, aluminophosphate glass, and zinc phosphate glass. Although not particularly limited, examples of the ceramic material include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Protective Layer)

A protective layer can be generally formed on an outermost side of the solid state battery, and used to electrically, physically, and/or chemically protect the solid state battery, particularly to protect the solid state battery laminate. As a material that can form the protective layer, preferred is a material that is excellent in insulation property, durability and/or moisture resistance, and is environmentally safe. For example, it is preferable to use glass, ceramics, a thermosetting resin and/or a photocurable resin.

(External Terminal)

The solid state battery may generally be provided with an external terminal. In particular, terminals of the positive and negative electrodes may be provided to form a pair on a side surface of the solid state battery. More specifically, the terminal on the positive electrode side connected to the positive electrode layer and the terminal on the negative electrode side connected to the negative electrode layer are provided so as to form a pair. As such a terminal, it is preferable to use a material having high conductivity. Although not particularly limited, examples of the material of the terminal include at least one selected from the group consisting of silver, gold, platinum, aluminum, copper, tin, and nickel.

[Features of Solid State Battery of Present Invention]

The solid state battery of the present invention is a solid state battery that includes the solid state battery laminate including, along the stacking direction, at least one battery constituent unit including the positive electrode layer, the negative electrode layer, and the solid electrolyte layer interposed between the positive electrode layer and the negative electrode layer, and includes the external terminal of the positive electrode terminal and the external terminal of the negative electrode terminal provided on respective opposing side surfaces of the solid state battery laminate, and the solid state battery is characterized in a shape of a terminal contact portion of the electrode layer (that is, the positive electrode layer and the negative electrode layer).

More specifically, the positive electrode layer and the negative electrode layer are constituted of the terminal contact portion that is in direct contact with each of the positive electrode terminal and the negative electrode terminal and a non-terminal contact portion other than the terminal contact portion, and a sectional area of the terminal contact portion along the opposing side surfaces (that is, each side surface including the external terminal) of the solid state battery laminate in at least one electrode layer is smaller than a sectional area of the non-terminal contact portion along the side surfaces.

Figure 6A:
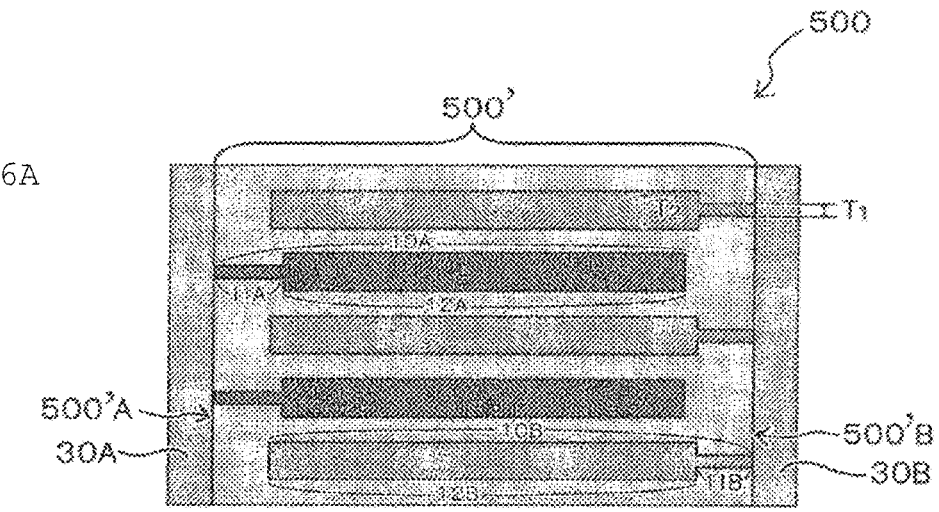
FIGS. 6A to 6C are each a sectional view schematically showing an embodiment in which a thickness dimension of the terminal contact portion in the electrode layer of the solid state battery according to the present invention is smaller than a thickness dimension of the non-terminal contact portion.

The term "terminal contact portion" used herein refers to a portion where at least heteropolar layers facing each other in the stacking direction do not exist. The term "non-terminal contact portion" refers to a portion other than the terminal contact portion in the electrode layer. That is, one electrode layer includes one terminal contact portion and one non-terminal contact portion. For example, as shown in FIGS. 1 and 6A, the positive electrode layer 10A includes a positive electrode terminal contact portion 11A and a positive electrode non-terminal contact portion 12A, and the negative electrode layer 10B includes a negative electrode terminal contact portion 11B and a negative electrode non-terminal contact portion 12B. Here, the positive electrode terminal contact portion 11A has a portion where at least the negative electrode layer 10B facing in the stacking direction does not exist, and the negative electrode terminal contact portion 11B has a portion where at least the positive electrode layer 10A facing in the stacking direction does not exist. A ratio (L1/L2) of a terminal contact portion length (L1) to an electrode layer length (L2) is 0.01 to 0.5.

The expression "the sectional area of the terminal contact portion along the opposing side surfaces of the solid state battery laminate is smaller than the sectional area of the non-terminal contact portion along the side surfaces" used herein means that in a sectional view along the opposing side surfaces (that is, each side surface including the external terminal) of the solid state battery laminate, a width dimension and/or a thickness dimension of a portion constituting the electrode layer of at least some terminal contact portions are/is smaller than a width dimension and/or a thickness dimension of a portion constituting the electrode layer of the non-terminal contact portion in the same electrode layer. According to the exemplary embodiment shown in FIG. 1, a width dimension $W_1$ of a portion constituting the electrode layer of the terminal contact portion 11B in a planar view is smaller than a width dimension $W_2$ of a portion constituting the electrode layer of the non-terminal contact portion 12B. That is, a sectional area (see FIG. 2A) of the terminal contact portion 11B along the opposing side surfaces (that is, a positive electrode side end surface 500'A and a negative electrode side end surface 500'B in FIG. 1) of the solid state battery laminate is smaller than a sectional area (see FIG. 2B) of the non-terminal contact portion 12B along the side surfaces.

As described above, from the viewpoint that the "terminal contact portion" is a portion having a different sectional area in one electrode layer, the "terminal contact portion" may refer to a portion having a different structure from the other portion in this one electrode layer.

In the solid state battery of the present invention, since the sectional area of the terminal contact portion of at least one electrode layer along the opposing side surfaces of the solid state battery laminate is smaller than the sectional area of the non-terminal contact portion along the side surfaces, a more desirable solid state battery is provided in terms of preventing deterioration of battery performance of the solid state battery. That is, strength of the solid state battery can be enhanced by reducing the sectional area of the terminal contact portion in the electrode layer and increasing a ratio of a battery constituent material (for example, solid electrolyte) having relatively high rigidity with respect to the electrode layer. When such a terminal contact portion contains an electrode active material, it is possible to reduce a volume change of the electrode layer during charging and discharging and to reduce stress generated between the electrode layer and the external terminal. Thus, cracking, peeling, and the like of the electrode layer can be suppressed.

According to the exemplary embodiment shown in FIG. 1, the positive electrode layer 10A, the solid electrolyte layer 20, and the negative electrode layer 10B are provided in this order in a stacking method of the solid state battery laminate 500'. The solid state battery laminate 500' is provided with the positive electrode terminal 30A and the negative electrode terminal 30B so as to be in contact with the two opposing side surfaces (that is, the positive electrode side end surface 500'A and the negative electrode side end surface 500'B).

The positive electrode layer 10A and the negative electrode layer 10B extend so as to terminate at the positive electrode side end surface 500'A and the negative electrode side end surface 500'B, respectively. The positive electrode layer 10A includes the positive electrode terminal contact portion 11A which is a portion terminating at the positive electrode side end surface 500'A and the positive electrode non-terminal contact portion 12A which is a portion other than the positive electrode terminal contact portion 11A. The negative electrode layer 10B includes the negative electrode terminal contact portion 11B which is a portion terminating at the negative electrode side end surface 500'B and the negative electrode non-terminal contact portion 12B which is a portion other than the negative electrode terminal contact portion 11B. Here, the positive electrode terminal contact portion 11A and the negative electrode terminal contact portion 11B are electrically connected to the positive electrode terminal 30A and the negative electrode terminal 30B, respectively.

A sectional area of the positive electrode terminal contact portion 11A in at least one positive electrode layer 10A along opposing side surfaces (that is, the positive electrode side end surface 500'A and the negative electrode side end surface 500'B) of the solid state battery laminate 500' is smaller than a sectional area of the positive electrode non-terminal contact portion 12A along the side surfaces, and/or a sectional area of the negative electrode terminal contact portion 11B in at least one negative electrode layer 10B along the opposing side surfaces of the solid state battery laminate is smaller than a sectional area of the negative electrode non-terminal contact portion 12B along the side surface.

With the configuration as described above, the ratio of the battery constituent material having relatively high rigidity with respect to the electrode layer can be increased, and the strength of the solid state battery can be enhanced, and/or when such a terminal contact portion contains an electrode active material, it is possible to reduce the volume change of the electrode layer during charging and discharging and to reduce stress generated between the electrode layer and the external terminal. Thus, cracking, peeling, and the like of the electrode layer can be suppressed.

In a more preferred embodiment, as in the configuration of FIG. 1 described above, the sectional areas of the positive electrode terminal contact portion 11A and the negative electrode terminal contact portion 11B along the opposing side surfaces of the solid state battery laminate are smaller than the sectional areas of the positive electrode non-terminal contact portion 12A and the negative electrode non-terminal contact portion 12B along the side surfaces, respectively. With such a configuration, stress generated between both electrode layers and the external terminal can be reduced, and cracking, peeling, and the like of the electrode layer can be suppressed. In a planar view and/or a sectional view of the solid state battery laminate 500', the solid state battery laminate 500' can have a symmetrical shape, and structural stability can be further improved.

In a preferred embodiment, a contact area of the terminal contact portion of at least one electrode layer with the external terminal is smaller than the sectional area of the non-terminal contact portion along the opposing side surfaces of the solid state battery laminate. According to the illustrated exemplary embodiment, as in the configuration of FIGS. 1, 4A, and 4B, a contact area between the positive electrode terminal contact portion 11A and the positive electrode terminal 30A is smaller than the sectional area of the positive electrode non-terminal contact portion 12A along the opposing side surfaces of the solid state battery laminate, and/or, a contact area between the negative electrode terminal contact portion 11B and the negative electrode terminal 30B is smaller than the sectional area of the negative electrode non-terminal contact portion 12B along the opposing side surfaces of the solid state battery laminate.

By reducing the contact area between the electrode layer and the external terminal as described above, it is possible to particularly reduce the stress generated between the electrode layer and the external terminal due to the volume change of the electrode layer during charging and discharging. In addition, entry of moisture into the solid state battery through the external terminal can be reduced. Thus, cracking, peeling, and the like of the electrode layer can be particularly suppressed, and deterioration of battery performance due to entry of moisture can be suppressed.

Figure 4A:
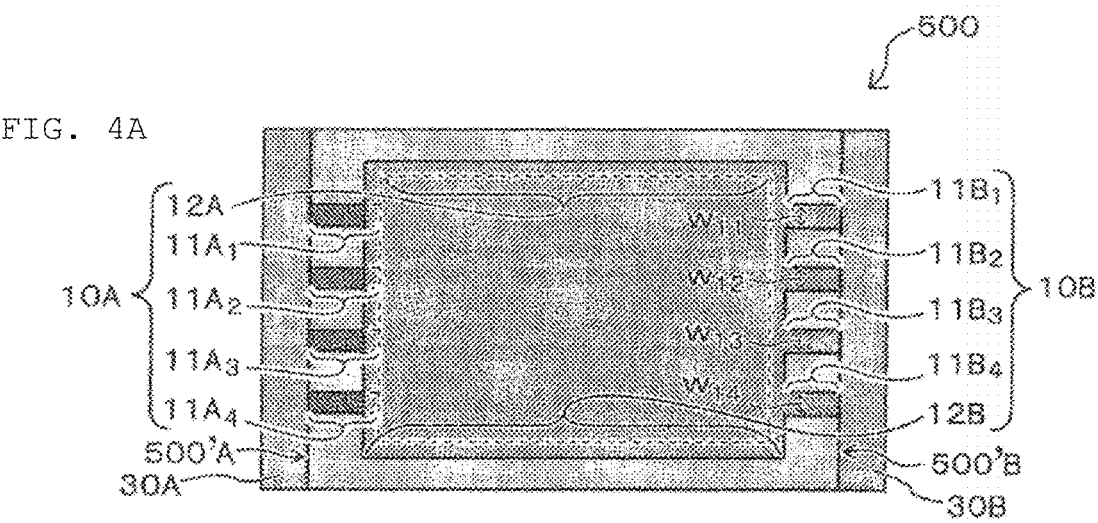
FIGS. 4A to 4C are each a plan view schematically showing another embodiment in which the width dimension of the terminal contact portion in the electrode layer of the solid state battery according to the present invention is smaller than the width dimension of the non-terminal contact portion.
Figure 4B:
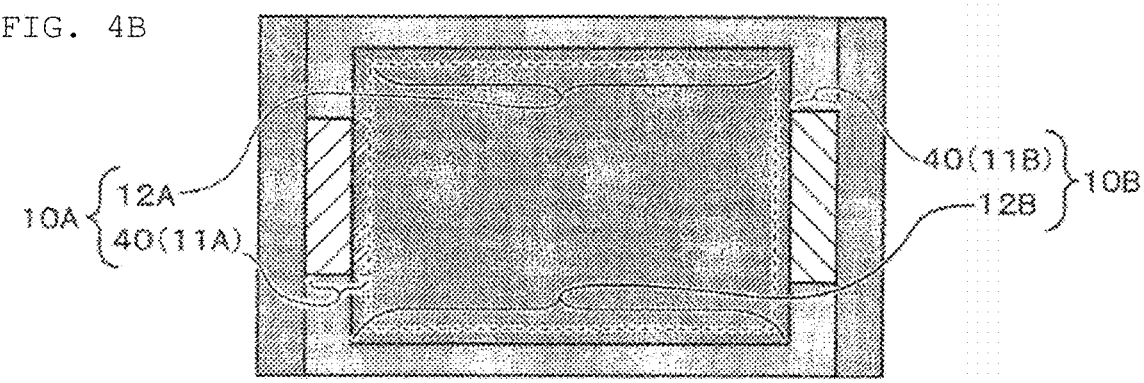
Figure 4C:
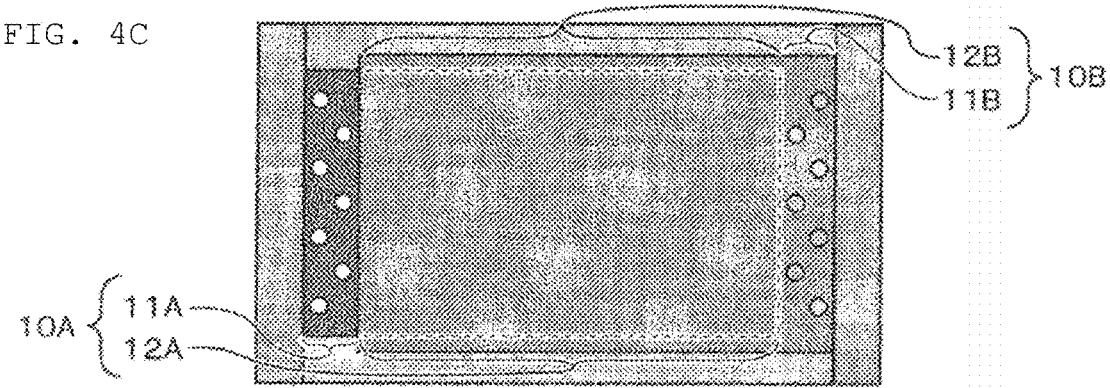

In a preferred embodiment, in a planar view of the solid state battery laminate, the width dimension of the terminal contact portion in at least one electrode layer is smaller than the width dimension of the non-terminal contact portion. According to the exemplary embodiment shown in FIG. 1, in the planar view of the solid state battery laminate 500', a width dimension of the positive electrode terminal contact portion 11A in the positive electrode layer 10A is smaller than a width dimension of the positive electrode non-terminal contact portion 12A. A width dimension of the negative electrode terminal contact portion 11B in the negative electrode layer 10B is smaller than a width dimension of the negative electrode non-terminal contact portion 12B. The width dimension of the terminal contact portion may be configured to be thin with respect to the non-terminal contact portion as shown in FIGS. 1, 4A, and 4B, and may be configured such that a portion where no electrode layer exists is dispersed in the terminal contact portion as shown in FIG. 4C.

In a more preferred embodiment, in the solid state battery laminate, a solid electrolyte and/or an insulating material are/is provided between at least one electrode layer and an external terminal in contact with the electrode layer. From the viewpoint of adhesion to the solid electrolyte layer in the solid state battery laminate, the solid electrolyte is preferably provided between at least one electrode layer and the external terminal in contact with the electrode layer. According to the exemplary embodiment shown in FIG. 1, in the planar view of the solid state battery laminate 500', a solid electrolyte 20' is provided between the positive electrode non-terminal contact portion 12A in the positive electrode layer 10A and the positive electrode terminal 30A, and/or the solid electrolyte 20' is provided between the negative electrode non-terminal contact portion 12B in the negative electrode layer 10B and the negative electrode terminal 30B.

As described above, by interposing the solid electrolyte and/or the insulating material having a relatively high strength with respect to the electrode layer in the region between the electrode layer and the external terminal in contact with the electrode layer, the strength of the solid state battery can be increased, and cracking, peeling, and the like of the electrode layer can be effectively suppressed.

Figure 3:
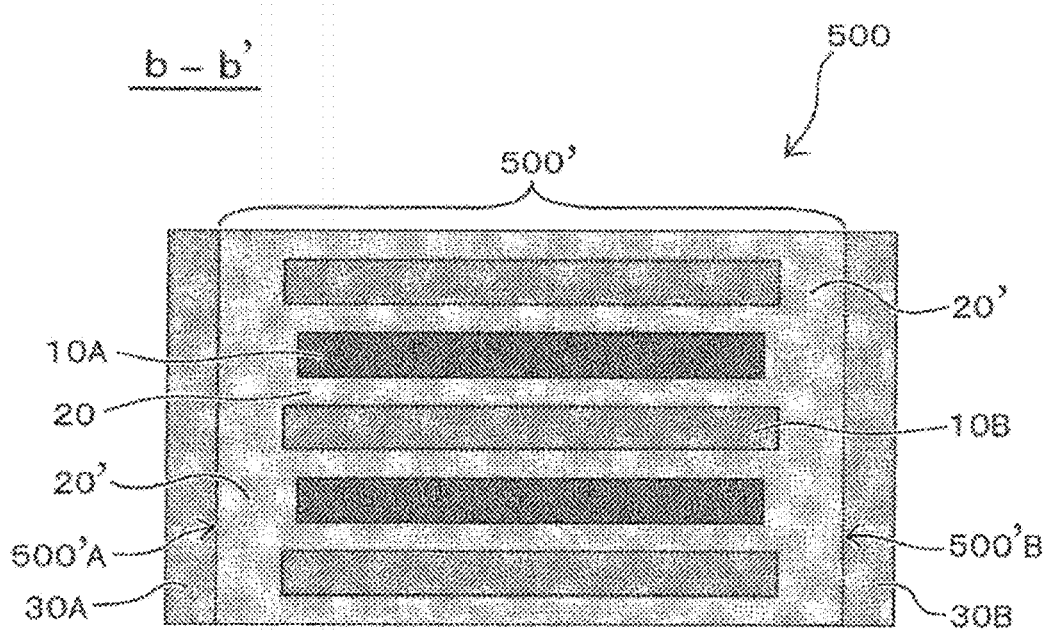
FIG. 3 is a sectional view schematically showing a section of the solid state battery taken along line b-b' in FIG. 1.

In a further preferred embodiment, in the solid state battery laminate, the solid electrolyte and/or the insulating material provided (interposed) between the electrode layer and the external terminal in contact with the electrode layer are/is integrated in the stacking direction. According to the exemplary embodiment shown in FIG. 3, in the sectional view of the solid state battery laminate 500', the solid electrolyte 20' provided (interposed) between the positive electrode layer 10A and the positive electrode terminal 30A is integrated in the stacking direction. In addition, the solid electrolyte 20' interposed between the negative electrode layer 10B and the negative electrode terminal 30B is integrated in the stacking direction.

As described above, with the configuration in which the solid electrolyte and/or the insulating material provided (interposed) between the electrode layer and the external terminal in contact with the electrode layer are/is integrated in the stacking direction, an interface (or an area thereof) between the electrode layer and the external terminal can be reduced, and the strength of the solid state battery can be increased. Thus, cracking, peeling, and the like of the electrode layer can be more effectively suppressed.

In another preferred embodiment, there are a plurality of terminal contact portions in at least one electrode layer in the planar view of the solid state battery laminate. According to the exemplified embodiment shown in FIG. 4A, a plurality of the positive electrode terminal contact portions 11A in the positive electrode layer 10A and a plurality of the negative electrode terminal contact portions 11B in the negative electrode layer 10B exist in a planar view of the solid state battery 500. More specifically, a plurality of positive electrode terminal contact portions $11A_1$ to $11A_4$ form the positive electrode terminal contact portion, and a plurality of negative electrode terminal contact portions $11B_1$ to $11B_4$ form the negative electrode terminal contact portion.

Figure 5A:
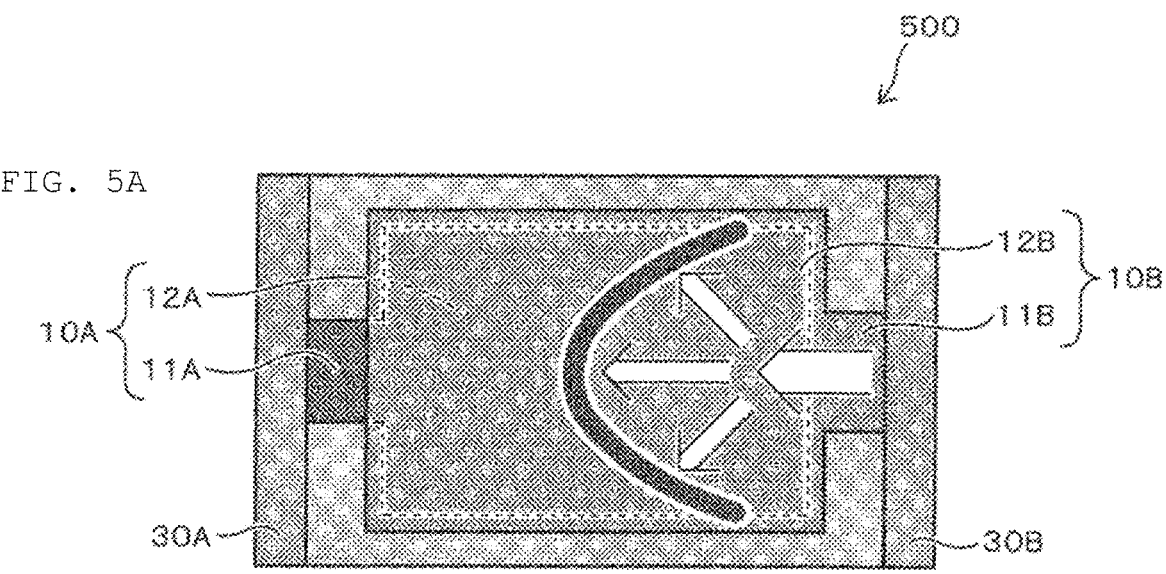
FIGS. 5A and 5B are schematic diagrams showing movement of electrons in the vicinity of the terminal contact portion in the solid state battery according to the embodiment of the present invention.
Figure 5B:
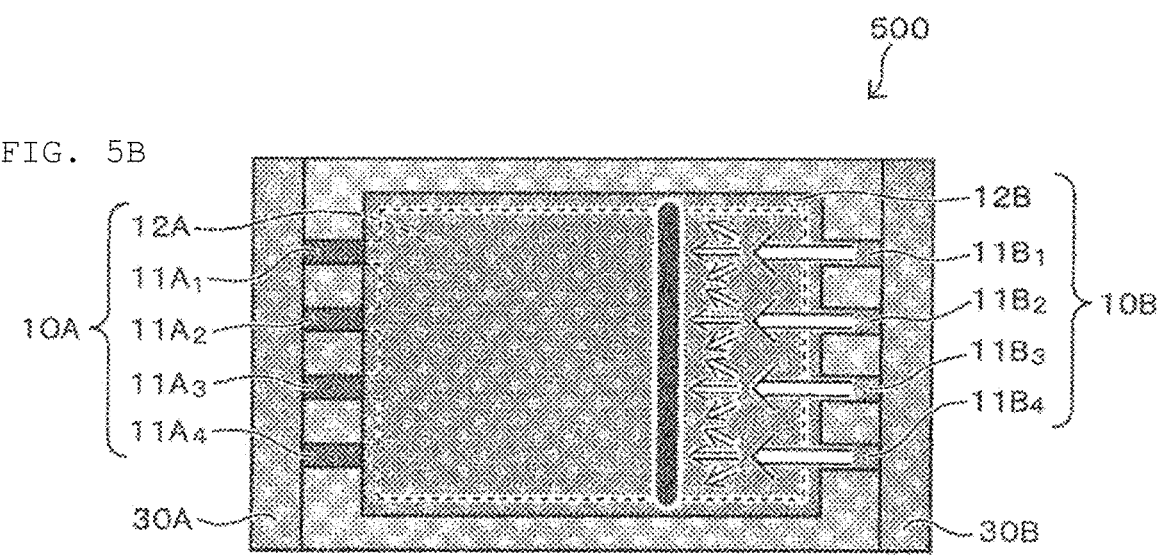

With the configuration as described above, an electron conduction distance between the electrode layer and the external terminal can be made more uniform as compared with a case of a single terminal contact portion. Thus, the reaction in the electrode layer can be more effectively uniformized (see FIGS. 5A and 5B). From the viewpoint of uniformity of the reaction, it is more preferable that the number of terminal contact portions is large so as to make the electron conduction distance between the terminal contact portion and the external terminal uniform. Although the number of the terminal contact portions is preferably 2 or more, and more preferably 3 or more, the number may be arbitrarily set by a value of a current flowing through the electrode and electric resistance. The plurality of terminal contact portions are more preferably positioned at substantially equal intervals in the planar view of the solid state battery laminate (see FIGS. 4A and 5B). Here, the substantially equal interval means a range in which the interval between the terminal contact portions falls within ±50% of an average value of the intervals between the terminal contact portions.

In another preferred embodiment, in the sectional view of the solid state battery laminate, the thickness dimension of the terminal contact portion in at least one electrode layer is smaller than the thickness dimension of the non-terminal contact portion. According to the exemplary embodiment shown in FIG. 6A, in the sectional view of the solid state battery laminate 500', a thickness dimension of the positive electrode terminal contact portion 11A in the positive electrode layer 10A is smaller than a thickness dimension of the positive electrode non-terminal contact portion 12A, and/or a thickness dimension of the negative electrode terminal contact portion 11B in the negative electrode layer 10B is smaller than a thickness dimension of the negative electrode non-terminal contact portion 12B.

Figure 6B:
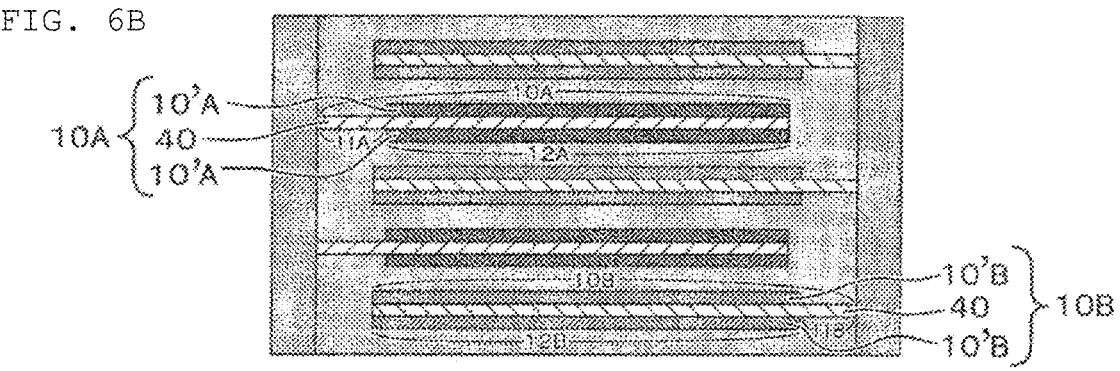

In another preferred embodiment, at least one electrode layer includes an electrode sub-active material layer and a sub-collector layer, and the terminal contact portion in the electrode layer includes only the sub-collector layer (see FIGS. 4B and 6B). According to the exemplary embodiment shown in FIG. 6B, in the sectional view of the solid state battery laminate 500', the positive electrode layer 10A includes a positive electrode sub-active material layer 10'A and a sub-collector layer 40, and the positive electrode terminal contact portion 11A includes only the sub-collector layer 40, and/or the negative electrode layer 10B includes a negative electrode sub-active material layer 10'B and the sub-collector layer 40, and the negative electrode terminal contact portion 11B includes only the sub-collector layer 40.

As described above, by using the sub-collector layer having relatively high strength with respect to the electrode layer as the terminal contact portion, if stress is generated during charging and discharging at the terminal contact portion, it is possible to provide strength that can withstand the stress. Thus, cracking, peeling, and the like of the electrode layer can be particularly suppressed. Since the electrode layer includes the sub-collector layer, the solid state battery laminate before sintering can be given strength at the time of manufacturing the solid state battery, and the solid state battery can be packed more effectively.

In a preferred embodiment, the sub-collector layer preferably contains a glass material. When the electrode layer includes the sub-collector layer as described above, the sub-collector layer contains a glass material, so that the terminal contact portion can be given higher strength, and the structural stability of the solid state battery can be further enhanced. Thus, cracking, peeling, and the like of the electrode layer that may occur during charging and discharging can be particularly suppressed.

In a preferred embodiment, there is provided a structure in which the positive electrode sub-active material layer and the sub-collector layer are stacked in the stacking direction of the positive electrode layer. According to the exemplary embodiment shown in FIGS. 6B and 6C, the sub-collector layer 40 is interposed between the two positive electrode sub-active material layers 10'A. With such a configuration, when a material having low electron conductivity is used for the positive electrode active material, the positive electrode layer can have high electron conductivity.

Figure 6C:
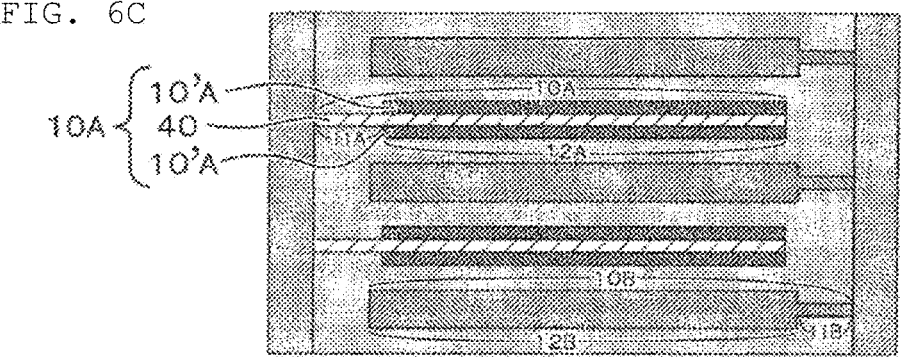

In a more preferred embodiment, the negative electrode layer 10B includes only the negative electrode sub-active material layer containing a carbon material, and the positive electrode layer includes the positive electrode sub-active material layer 10'A and the sub-collector layer 40 (see FIG. 6C). With such a configuration, charge/discharge efficiency can be improved by increasing electron conductivity in the positive electrode, and energy density of the battery can be increased by increasing an amount of the active material in the negative electrode layer in the negative electrode.

The "width dimension of the terminal contact portion" used herein refers to "$W_1$" in FIG. 1 in the illustrated exemplary embodiment, and when there are a plurality of the terminal contact portions as shown in FIG. 4A, this term refers to the sum of the width dimensions of the plurality of terminal contact portions (that is, the sum of "$W_{11}$", "$W_{12}$", "$W_{14}$", and "$W_{14}$" in G. 4A). The "width dimension of the non-terminal contact portion" refers to "$W_2$" in FIG. 1.

The "thickness dimension of the terminal contact portion" used herein refers to "$T_1$" in FIG. 6A in the illustrated exemplary embodiment, and the "thickness dimension of the non-terminal contact portion" refers to "$T_2$" in FIG. 6A.

Figure 7:
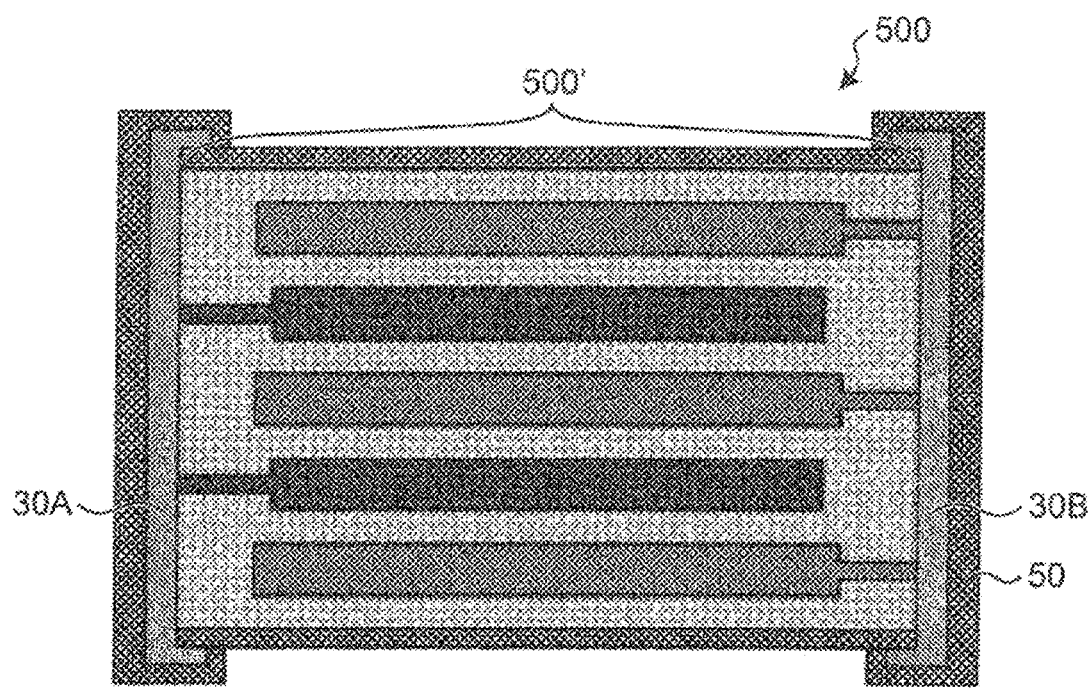
FIG. 7 is a sectional view schematically showing the solid state battery according to an embodiment of the present invention.

In a preferred embodiment, the solid state battery may further include a protective layer. As shown in FIG. 7, a protective layer 50 may be provided outside the solid state battery laminate 500', the positive electrode terminal 30A, and the negative electrode terminal 30B so as to be integrated with them.

In a preferred embodiment, a dimension of a portion constituting the electrode layer of at least some terminal contact portions is smaller than a dimension of a portion constituting the electrode layer of the non-terminal contact portion in a planar view and/or sectional view, and the dimension ratio (terminal contact portion/non-terminal contact portion) is, for example, 0.5 or less. When the dimension ratio is 0.5 or less, the strength of the solid state battery can be further enhanced by reducing the sectional area of the terminal contact portion in the electrode layer and increasing the ratio of the battery constituent material having relatively high rigidity with respect to the electrode layer. The dimensional ratio is preferably 0.45 or less, and more preferably 0.4 or less.

The dimension ratio as described above can be adjusted by, for example, the dimension of the terminal contact portion 11A and/or the dimension of the terminal contact portion 11B in a planar view and/or sectional view (see FIGS. 1, 4A, 4B and 6A to 6C). That is, for example, the width dimension and/or the thickness dimension of the terminal contact portion 11A and/or the terminal contact portion 11B in the solid state battery 500 may be adjusted such that the dimension ratio is, for example, 0.5 or less with respect to the width dimension and/or the thickness dimension of the non-terminal contact portion 12A and/or the non-terminal contact portion 12B.

The structure of the solid state battery in the present specification may be observed from an image acquired by cutting out a section in a sectional view direction by an ion milling apparatus (model number IM4000PLUS manufactured by Hitachi High-Tech Corporation) and using a scanning electron microscope (SEM) (model number SU-8040 manufactured by Hitachi High-Tech Corporation). The dimension ratio used herein may refer to a value calculated from a dimension measured from an image acquired by the above-described method.

The solid state battery according to the present invention is a stacked solid state battery formed by stacking layers constituting the battery constituent unit, and can be manufactured by a printing method such as a screen printing method, a green sheet method using a green sheet, or a method combining these methods.

Thus, the layers constituting the battery constituent unit may be composed of a sintered body. Preferably, the positive electrode layer, the negative electrode layer, and the solid electrolyte layer are integrally sintered with each other. That is, it can be said that the solid state battery laminate forms a fired integrated product. In such a fired integrated product, in at least one of the electrode layers, the sectional area of the terminal contact portion along the opposing side surfaces of the solid state battery laminate is smaller than the sectional area of the non-terminal contact portion along the side surfaces.

[Method of Manufacturing Solid State Battery]

As described above, the solid state battery of the present invention can be manufactured by a printing method such as a screen printing method, a green sheet method using a green sheet, or a method combining these methods. Hereinafter, a case where the printing method and the green sheet method are adopted for understanding the present invention will be described in detail, but the present invention is not limited to these methods.

(Step of Forming Solid State Battery Laminate Precursor)

In the present step, several types of pastes such as a positive electrode layer paste, a negative electrode layer paste, a solid electrolyte layer paste, a current collecting layer paste, an insulating layer paste (paste for an electrode separation portion), and a protective layer paste are used as ink. That is, a paste having a predetermined structure is formed or stacked on a supporting substrate by applying the paste by the printing method.

In the printing, printing layers are sequentially stacked with a predetermined thickness and a predetermined pattern shape, whereby a solid state battery laminate precursor corresponding to a structure of a predetermined solid state battery can be formed on the substrate. The kind of the pattern forming method is not particularly limited as long as the pattern forming method is a method capable of forming a predetermined pattern, and, for example, one or two or more of a screen printing method, a gravure printing method, and the like may be used.

The paste can be prepared by wet mixing a predetermined constituent material of each layer appropriately selected from the group consisting of the positive electrode active material, the negative electrode active material, the electron conductive material, the solid electrolyte material, a current collecting layer material, the insulating material, the binder, and the sintering aid, and the like with an organic vehicle in which an organic material is dissolved in a solvent. The positive electrode layer paste contains, for example, a positive electrode active material, an electron conductive material, a solid electrolyte material, a binder, a sintering aid, an organic material, and a solvent. The negative electrode layer paste contains, for example, a negative electrode active material, an electron conductive material, a solid electrolyte material, a binder, a sintering aid, an organic material, and a solvent. The solid electrolyte layer paste contains, for example, a solid electrolyte material, a binder, a sintering aid, an organic material, and a solvent. A positive electrode current collecting layer paste and a negative electrode current collecting layer paste each contain, for example, an electron conductive material, a binder, a sintering aid, an organic material, and a solvent. The protective layer paste contains, for example, an insulating material, a binder, an organic material, and a solvent. The insulating layer paste contains, for example, an insulating material, a binder, an organic material, and a solvent.

The organic material that can be contained in the paste is not particularly limited, and it is possible to use at least one polymer material selected from the group consisting of a polyvinyl acetal resin, a cellulose resin, a polyacrylic resin, a polyurethane resin, a polyvinyl acetate resin, a polyvinyl alcohol resin, and the like. The type of the solvent is not particularly limited, and the solvent is, for example, one or two or more organic solvents such as butyl acetate, N-methyl-pyrrolidone, toluene, terpineol, and N-methyl-pyrrolidone.

In the wet mixing, a medium can be used, and specifically, a ball mill method, a visco mill method, or the like can be used. On the other hand, wet mixing methods may be used which use no media, and a sand mill method, a high-pressure homogenizer method, a kneader dispersion method, or another method can be used.

The supporting substrate is not particularly limited as long as the supporting substrate is a support capable of supporting each paste layer, and the supporting substrate is, for example, a release film having one surface subjected to a release treatment, or the like. Specifically, a substrate formed from a polymer material such as polyethylene terephthalate can be used. When each paste layer is used in the firing step while being held on the substrate, a substrate having heat resistance to firing temperature may be used.

The applied paste is dried on a hot plate heated to 30° C. or higher and 50° C. or lower to form, on the substrate (for example, a PET film), a positive electrode layer green sheet, a negative electrode layer green sheet, a solid electrolyte layer green sheet, a current collecting layer green sheet, an insulating layer green sheet and/or a protective layer green sheet or the like having a predetermined shape and thickness.

Next, each green sheet is peeled off from the substrate. After the peeling, the green sheets of the constituent elements of the battery constituent unit are sequentially stacked along the stacking direction to form a solid state battery laminate precursor. After the stacking, a solid electrolyte layer, an insulating layer and/or a protective layer may be provided in a side region of an electrode green sheet by screen printing.

(Firing Step)

In the firing step, the solid state battery laminate precursor is subjected to firing. Although the followings are merely examples, firing is carried out by removing the organic material in a nitrogen gas atmosphere containing oxygen gas or in the atmosphere, for example, at 500° C., and then heating in the nitrogen gas atmosphere or in the atmosphere, for example, at 550° C. or higher and 5000° C. or lower. Firing may be carried out while pressurizing the solid state battery laminate precursor in the stacking direction (in some cases, stacking direction and direction perpendicular to the stacking direction).

By undergoing such firing, a solid state battery laminate is formed, so that a desired solid state battery is finally obtained.

(Preparation of Characteristic Portion in Present Invention)

The terminal contact portion in the electrode layer of the solid state battery of the present invention may be formed by any method as long as the sectional area of the terminal contact portion along the opposing side surfaces of the solid state battery laminate is smaller than the sectional area of the non-terminal contact portion along the side surfaces. For example, the layer formation may be performed such that the width dimension and/or the thickness dimension of the terminal contact portion are/is smaller than the width dimension and/or the thickness dimension of the non-terminal contact portion.

Figure 8A:
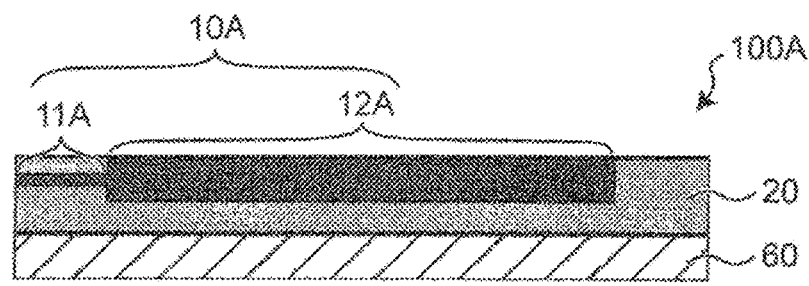
FIGS. 8A to 8C are sectional views schematically shown for explaining a method of manufacturing a solid state battery according to an embodiment of the present invention.

Hereinafter, a method of manufacturing a solid state battery will be specifically described based on exemplary embodiment shown in FIGS. 8A to 8C.

In order to manufacture the solid state battery, for example, as described later, a step of forming a positive electrode layer green sheet 100A, a step of forming a negative electrode layer green sheet 100B, a step of forming the solid state battery laminate 500', and a step of forming each of the positive electrode terminal 30A and the negative electrode terminal 30B are performed.

[Step of Forming Positive Electrode Layer Green Sheet]

First, a solid electrolyte layer paste is prepared by mixing a solid electrolyte, a solvent, optionally an electrolyte binder, etc. Subsequently, as shown in FIG. 8A, the solid electrolyte layer 20 is formed by applying the solid electrolyte layer paste to one surface of a substrate 60. At this time, the solid electrolyte layer paste is applied so that both ends are thick so that the solid electrolyte layer 20 is concave. The paste is applied thickly so that one of the ends has the same height as the electrode layer to be applied subsequently, and the paste is thinly applied to the other end relative to the one end.

Subsequently, a positive electrode layer paste is prepared by mixing a positive electrode active material, a solvent, optionally a positive electrode active material binder, etc. Subsequently, the positive electrode layer paste is applied to the surface of the solid electrolyte layer 20 (that is, a recessed portion and a thinly formed portion of the solid electrolyte layer 20) by using the pattern forming method to form the positive electrode layer 10A. At this time, the positive electrode layer 10A is formed such that the end becomes a recessed portion by thinly applying the positive electrode layer paste to a surface of the thinly formed portion of the solid electrolyte layer 20.

Finally, the solid electrolyte layer paste is applied to a recessed portion of a surface of an end of the positive electrode layer 10A. As a result, the positive electrode layer green sheet 100A is obtained in which the positive electrode layer 10A constituted of the positive electrode non-terminal contact portion 12A and the positive electrode terminal contact portion 11A thinner than the positive electrode non-terminal contact portion 12A is formed.

[Step of Forming Negative Electrode Layer Green Sheet]

Figure 8B:
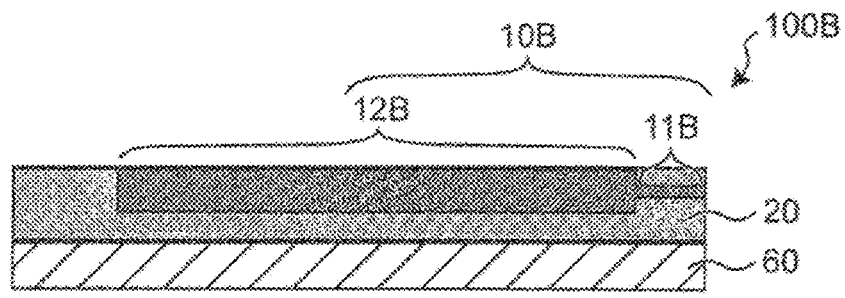
Figure 8C:
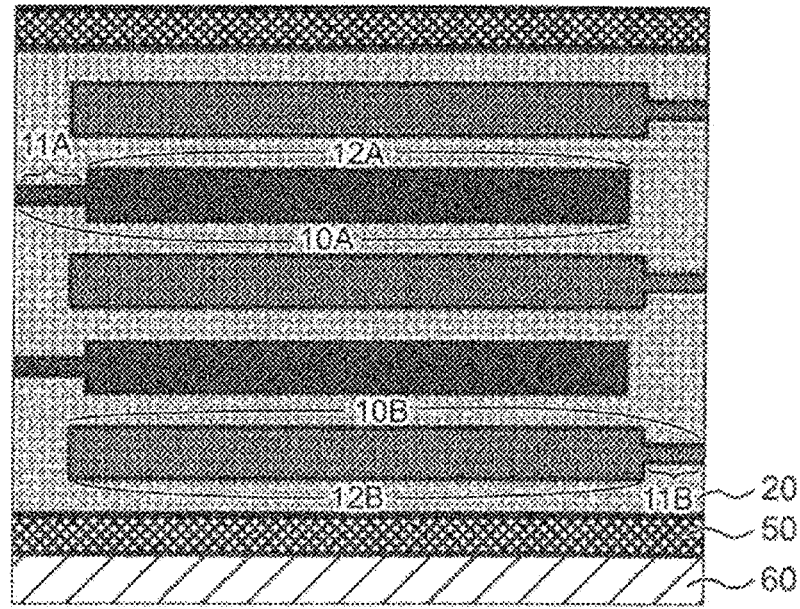
Figure 9A:
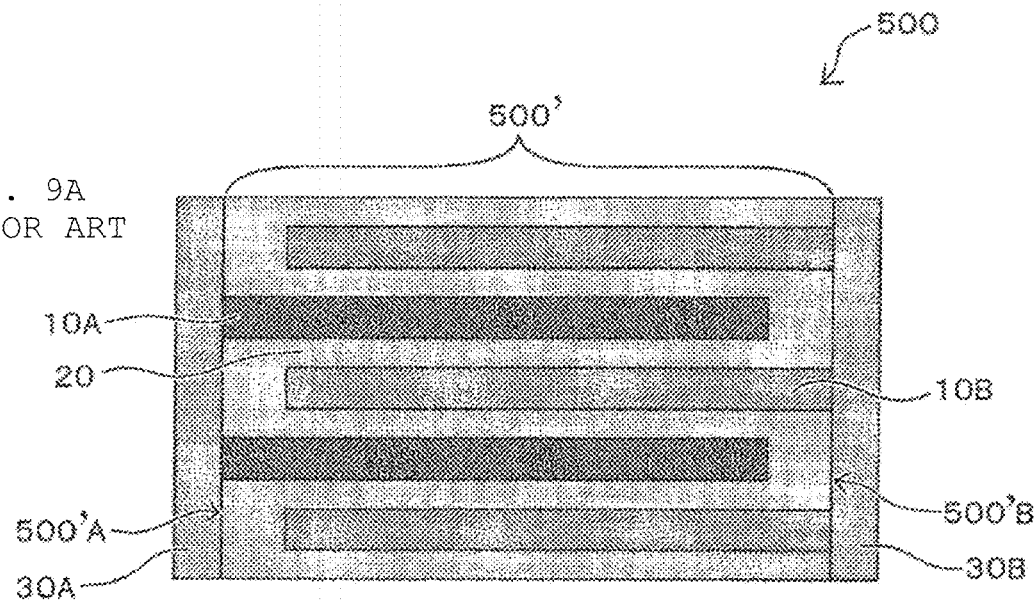
FIGS. 9A and 9B are a sectional view and a plan view, respectively, schematically showing a conventional solid state battery.
Figure 9B:
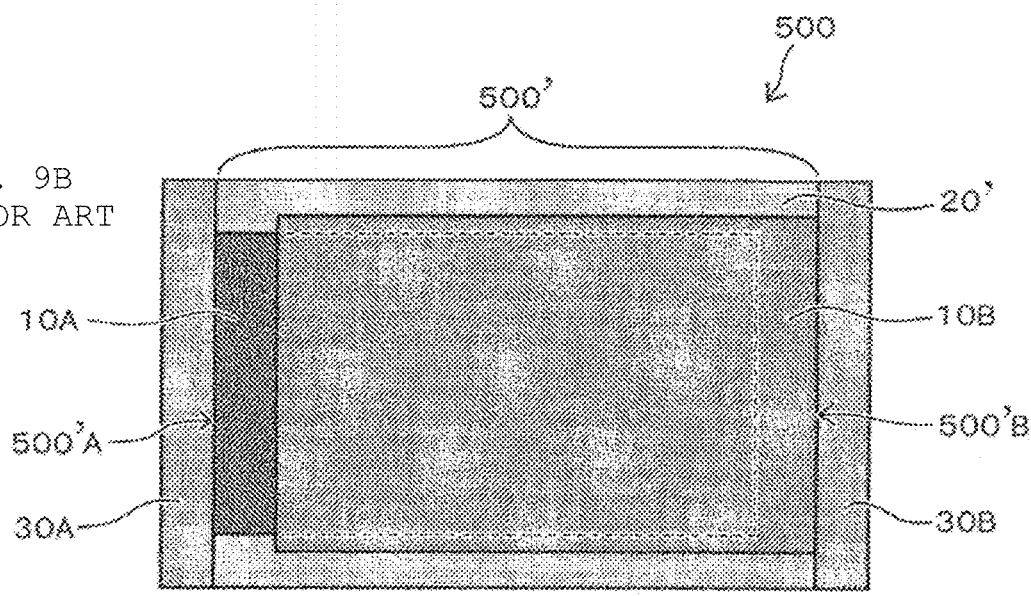

First, as shown in FIG. 8B, the solid electrolyte layer 20 is formed on one surface of the substrate 60 by the above-described procedure.

Subsequently, a negative electrode layer paste is prepared by mixing a negative electrode active material, a solvent, optionally a negative electrode active material binder, etc. Subsequently, the negative electrode layer paste is applied to the surface of the solid electrolyte layer 20 (that is, a recessed portion of the solid electrolyte layer 20 and a portion of the solid electrolyte layer 20 formed thinner than one end) by using the pattern forming method to form the negative electrode layer 10B. At this time, the negative electrode layer 10B is formed such that one end of the solid electrolyte layer 20 becomes a recessed portion by thinly applying the negative electrode layer paste to a surface of the portion of the solid electrolyte layer 20 formed thinner than the one end.

Finally, the solid electrolyte layer paste is applied to a recessed portion of a surface of an end of the negative electrode layer 10B. As a result, the negative electrode layer green sheet 100B is obtained in which the negative electrode layer 10B constituted of the negative electrode non-terminal contact portion 12B and the negative electrode terminal contact portion 11B thinner than the negative electrode non-terminal contact portion 12B is formed.

The green sheet forming step in the embodiment in which the thickness dimension of the terminal contact portion is smaller than the thickness dimension of the non-terminal contact portion (for example, the embodiment of FIG. 6A and the like) has been described above. However, the green sheet can be similarly formed in the embodiment in which the width dimension of the terminal contact portion is smaller than the width dimension of the non-terminal contact portion (for example, the embodiment of FIG. 1 and the like). For example, the positive electrode layer green sheet and the negative electrode layer green sheet can be similarly formed by applying each paste such that the terminal contact portion has a small width dimension with respect to the non-terminal contact portion in a planar view.

[Step of Forming Solid State Battery Laminate]

First, a protective layer paste is prepared by mixing a protective solid electrolyte, a solvent, optionally a protective binder, etc. Alternatively, the protective layer paste is prepared by mixing a protective solid electrolyte, a solvent, an insulating material, optionally a protective binder, etc. Subsequently, as shown in FIG. 8C, the protective layer 50 is formed by applying the protective layer paste to one surface of the substrate 60.

Subsequently, the negative electrode layer green sheet 100B peeled from the substrate 60 and the positive electrode layer green sheet 100A are alternately stacked in this order on the protective layer 50. In this case, for example, three negative electrode green sheets 100B and two positive electrode layer green sheets 100A are alternately stacked.

Subsequently, the solid electrolyte layer 20 is formed on the negative electrode layer green sheet 100B, peeled from the substrate 60, by a procedure similar to the procedure for forming the solid electrolyte layer 20, and then the protective layer 50 is formed on the solid electrolyte layer 20 by a procedure similar to the procedure for forming the protective layer 50. Subsequently, the lowermost substrate 60 is peeled, whereby a solid state battery laminate precursor 500Z can be formed.

Finally, the solid state battery laminate precursor 500Z is heated. In this case, the heating temperature is set so that the series of layers forming the solid state battery laminate precursor 500Z are sintered. Other conditions such as heating time can be set arbitrarily.

By this heat treatment, the series of layers forming the solid state battery laminate precursor 500Z are sintered, so that the series of layers are thermocompression-bonded. Thus, the solid state battery laminate 500' can be preferably integrally formed as a sintered body.

[Step of Forming Each of Positive Electrode Terminal and Negative Electrode Terminal]

For example, the positive electrode terminal is bonded to the solid state battery laminate using a conductive adhesive, and, for example, the negative electrode terminal is bonded to the solid state battery laminate using a conductive adhesive. Consequently, each of the positive electrode terminal and the negative electrode terminal is attached to the solid state battery laminate, so that the solid state battery is completed.

Although the embodiments of the present invention have been described above, those are merely typical examples. Therefore, the present invention is not limited to those embodiments, and those skilled in the art will readily understand that various aspects can be conceived without changing the gist of the present invention.

For example, in the above description, for example, the solid state battery exemplified in FIG. 1 and the like has been mainly described, but the present invention is not necessarily limited thereto. The present invention can be similarly applied to any battery as long as a positive electrode layer, a negative electrode layer, and a solid electrolyte layer are included, and the sectional area of the terminal contact portion in at least one electrode layer along the opposing side surfaces of the solid state battery laminate is smaller than the sectional area of the non-terminal contact portion.

The solid state battery of the present invention can be used in various fields in which electricity storage is assumed. Although the followings are merely examples, the solid state battery of the present invention can be used in electricity, information and communication fields where electrical/electronic equipment and the like are used (e.g., electrical/electronic equipment fields or mobile device fields including mobile phones, smart phones, laptop computers, digital cameras, activity meters, arm computers, electronic papers, and small electronic devices such as RFID tags, card type electronic money, and smartwatches), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, and home-installation type power storage systems), medical applications (medical equipment fields such as earphone hearing aids), pharmaceutical applications (the fields such as dose management systems), IoT fields, and space and deep sea applications (e.g., the fields such as spacecraft and research submarines).

DESCRIPTION OF REFERENCE SYMBOLS

10: Electrode layer
11: Electrode terminal contact portion
12: Electrode non-terminal contact portion
10A: Positive electrode layer
10'A: Positive electrode sub-active material layer
11A: Positive electrode terminal contact portion
12A: Positive electrode non-terminal contact portion
10B: Negative electrode layer
10'B: Negative electrode sub-active material layer
11B: Negative electrode terminal contact portion
12B: Negative electrode non-terminal contact portion
20: Solid electrolyte layer
20': Solid electrolyte
30: Terminal
30A: Positive electrode terminal
30B: Negative electrode terminal
40: Sub-collector layer
50: Protective layer
60: Supporting substrate (substrate)
100: Green sheet
100A: Positive electrode layer green sheet
100B: Negative electrode layer green sheet
500Z: Solid state battery laminate precursor
500': Solid state battery laminate
500'A: Positive electrode side end surface
500'B: Negative electrode side end surface
500: Solid state battery

The invention claimed is:

1. A solid state battery comprising:
a solid state battery laminate comprising, along a stacking direction thereof, at least one battery constituent unit having a positive electrode layer, a negative electrode layer, and a solid electrolyte layer interposed between the positive electrode layer and the negative electrode layer;
a positive electrode external terminal on a first side surface of the solid state battery laminate; and
a negative electrode external terminal on a second side surface of the solid state battery laminate opposite the first side surface,
wherein the positive electrode layer and the negative electrode layer each include a terminal contact portion in direct contact with the positive electrode external terminal and the negative electrode external terminal, respectively, and a non-terminal contact portion that is not in direct contact with the positive electrode external terminal and the negative electrode external terminal, respectively, and
in both of the positive electrode layer and the negative electrode layer, a sectional area of the terminal contact portion along the respective first or second side surfaces of the solid state battery laminate is smaller than a sectional area of the non-terminal contact portion along the respective first or second side surfaces.

2. The solid state battery according to claim 1, wherein a contact area of the terminal contact portion of at least one of the positive electrode layer and the negative electrode layer with the positive electrode external terminal or the negative electrode external terminal is smaller than the sectional area of the non-terminal contact portion along the respective first or second side surfaces of the solid state battery laminate.

3. The solid state battery according to claim 2, wherein in a planar view of the solid state battery laminate, a width dimension of the terminal contact portion in the at least one of the positive electrode layer and the negative electrode layer is smaller than a width dimension of the non-terminal contact portion.

4. The solid state battery according to claim 1, wherein in a planar view of the solid state battery laminate, a width dimension of the terminal contact portion in at least one of the positive electrode layer and the negative electrode layer is smaller than a width dimension of the non-terminal contact portion.

5. The solid state battery according to claim 1, wherein in the solid state battery laminate, the solid electrolyte is between at least one of the positive electrode layer and the negative electrode layer and the positive electrode external terminal or the negative electrode external terminal in contact with, respectively, the at least one of the positive electrode layer and the negative electrode layer.

6. The solid state battery according to claim 5, wherein in the solid state battery laminate, the solid electrolyte is integrated in the stacking direction.

7. The solid state battery according to claim 1, wherein in the solid state battery laminate, an insulating material is between at least one of the positive electrode layer and the negative electrode layer and the positive electrode external terminal or the negative electrode external terminal in contact with, respectively, the at least one of the positive electrode layer and the negative electrode layer.

8. The solid state battery according to claim 7, wherein in the solid state battery laminate, the insulating material is integrated in the stacking direction.

9. The solid state battery according to claim 1, wherein at least one of the positive electrode layer and the negative electrode layer includes a plurality of terminal contact portions in a planar view of the solid state battery laminate.

10. The solid state battery according to claim 9, wherein the plurality of terminal contact portions are positioned at substantially equal intervals in the planar view of the solid state battery laminate.

11. The solid state battery according to claim 1, wherein in a sectional view of the solid state battery laminate, a thickness dimension of the terminal contact portion in at least one of the positive electrode layer and the negative electrode layer is smaller than a thickness dimension of the non-terminal contact portion thereof.

12. The solid state battery according to claim 1, wherein at least one of the positive electrode layer and the negative electrode layer comprises an electrode sub-active material layer and a sub-collector layer, and the terminal contact portion in the at least one of the positive electrode layer and the negative electrode layer comprises only the sub-collector layer.

13. The solid state battery according to claim 1, wherein the positive electrode layer and the negative electrode layer are layers capable of insertion and extraction of lithium ions.

14. A solid state battery comprising:
a solid state battery laminate comprising, along a stacking direction thereof, at least one battery constituent unit comprising a positive electrode layer, a negative electrode layer, and a solid electrolyte layer interposed between the positive electrode layer and the negative electrode layer;
a positive electrode external terminal on a first side surface of the solid state battery laminate; and
a negative electrode external terminal on a second side surface of the solid state battery laminate opposite the first side surface,
wherein the positive electrode layer and the negative electrode layer each include a terminal contact portion in direct contact with the positive electrode external terminal and the negative electrode external terminal, respectively, and a non-terminal contact portion that is not in direct contact with the positive electrode external terminal and the negative electrode external terminal, respectively, and
in a planar view of the solid state battery laminate, a width dimension and/or a thickness dimension of the terminal contact portion in both of the positive electrode layer and the negative electrode layer are/is smaller than a respective width dimension and/or a respective thickness dimension of the non-terminal contact portion thereof.

15. The solid state battery according to claim 14, wherein a contact area of the terminal contact portion of at least one of the positive electrode layer and the negative electrode layer with the positive electrode external terminal or the negative electrode external terminal is smaller than the sectional area of the non-terminal contact portion along the respective first or second side surfaces of the solid state battery laminate.

16. The solid state battery according to claim 14, wherein in the solid state battery laminate, the solid electrolyte is between at least one of the positive electrode layer and the negative electrode layer and the positive electrode external terminal or the negative electrode external terminal in contact with, respectively, the at least one of the positive electrode layer and the negative electrode layer.

17. The solid state battery according to claim 16, wherein in the solid state battery laminate, the solid electrolyte is integrated in the stacking direction.

18. The solid state battery according to claim 14, wherein in the solid state battery laminate, an insulating material is between at least one of the positive electrode layer and the negative electrode layer and the positive electrode external terminal or the negative electrode external terminal in contact with, respectively, the at least one of the positive electrode layer and the negative electrode layer.

19. The solid state battery according to claim 18, wherein in the solid state battery laminate, the insulating material is integrated in the stacking direction.

20. The solid state battery according to claim 14, wherein at least one of the positive electrode layer and the negative electrode layer includes a plurality of terminal contact portions in a planar view of the solid state battery laminate.

* * * * *